US011693797B2

(12) United States Patent
Steinmetz et al.

(10) Patent No.: US 11,693,797 B2
(45) Date of Patent: *Jul. 4, 2023

(54) ENABLING DEVICES WITH ENHANCED PERSISTENT MEMORY REGION ACCESS

(71) Applicant: Micron Technology, Inc., Boise, ID (US)

(72) Inventors: Joseph H. Steinmetz, Loomis, CA (US); Luca Bert, San Jose, CA (US); William Akin, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,717

(22) Filed: Jul. 18, 2022

(65) Prior Publication Data

US 2022/0350759 A1 Nov. 3, 2022

Related U.S. Application Data

(63) Continuation of application No. 17/159,487, filed on Jan. 27, 2021, now Pat. No. 11,429,544.

(Continued)

(51) Int. Cl.
*G06F 11/00* (2006.01)
*G06F 13/16* (2006.01)
(Continued)

(52) U.S. Cl.
CPC ...... *G06F 13/1668* (2013.01); *G06F 11/0727* (2013.01); *G06F 11/0751* (2013.01);
(Continued)

(58) Field of Classification Search
CPC ............. G06F 11/0727; G06F 11/0772; G06F 11/0751; G06F 11/073; G06F 11/0766;
(Continued)

(56) References Cited

U.S. PATENT DOCUMENTS 7,620,731 B1 * 11/2009 Dasan ....................... G06F 9/52
709/239
2012/0151118 A1 6/2012 Flynn et al.
(Continued)

FOREIGN PATENT DOCUMENTS

CN 109697028 A 4/2019
CN 111831469 A 10/2020

OTHER PUBLICATIONS

USPTO, Notice of Allowance for U.S. Appl. No. 17/159,487, dated Apr. 28, 2022.

*Primary Examiner* — Katherine Lin
(74) *Attorney, Agent, or Firm* — Lowenstein Sandler LLP

(57) ABSTRACT

A system includes a first memory device including a non-volatile memory device, a second memory device and a processing device, operatively coupled with the first memory device and the second memory device, to perform operations including configuring a system in accordance with a configuration designating an interface standard for exposing a storage element implemented on the first memory device to a first protocol of the interface standard and a persistent memory region (PMR) implemented on the second memory device to a second protocol of the interface standard, and performing at least one system operation based on the configuration.

17 Claims, 6 Drawing Sheets

Related U.S. Application Data

(60) Provisional application No. 63/127,210, filed on Dec. 18, 2020.

(51) Int. Cl.
*G06F 11/07* (2006.01)
*G06F 13/42* (2006.01)

(52) U.S. Cl.
CPC ...... *G06F 11/0772* (2013.01); *G06F 13/4282* (2013.01); *G06F 2213/0026* (2013.01)

(58) Field of Classification Search
CPC ............. G06F 11/0775; G06F 11/0781; G06F 11/0787; G06F 11/0784; G06F 11/079
See application file for complete search history.

(56) References Cited

U.S. PATENT DOCUMENTS

| | | |
|---|---|---|
| 2016/0259568 A1 | 9/2016 | Grimsrud et al. |
| 2019/0340058 A1 | 11/2019 | Sasidharan et al. |
| 2021/0334030 A1 | 10/2021 | Yang et al. |

\* cited by examiner

ENABLING DEVICES WITH ENHANCED PERSISTENT MEMORY REGION ACCESS

RELATED APPLICATIONS

This application is a continuation of U.S. patent application Ser. No. 17/159,487, filed on Jan. 27, 2021 and entitled "ENABLING DEVICES WITH ENHANCED PERSISTENT MEMORY REGION ACCESS," which claims the benefit of U.S. Provisional Patent Application No. 63/127,210, filed on Dec. 18, 2020 and entitled "ENABLING DEVICES WITH ENHANCED PERSISTENT MEMORY REGION ACCESS," the entire contents of which are incorporated herein by reference.

TECHNICAL FIELD

Embodiments of the disclosure relate generally to memory sub-systems, and more specifically, relate to enabling devices with enhanced persistent memory region (PMR) access.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
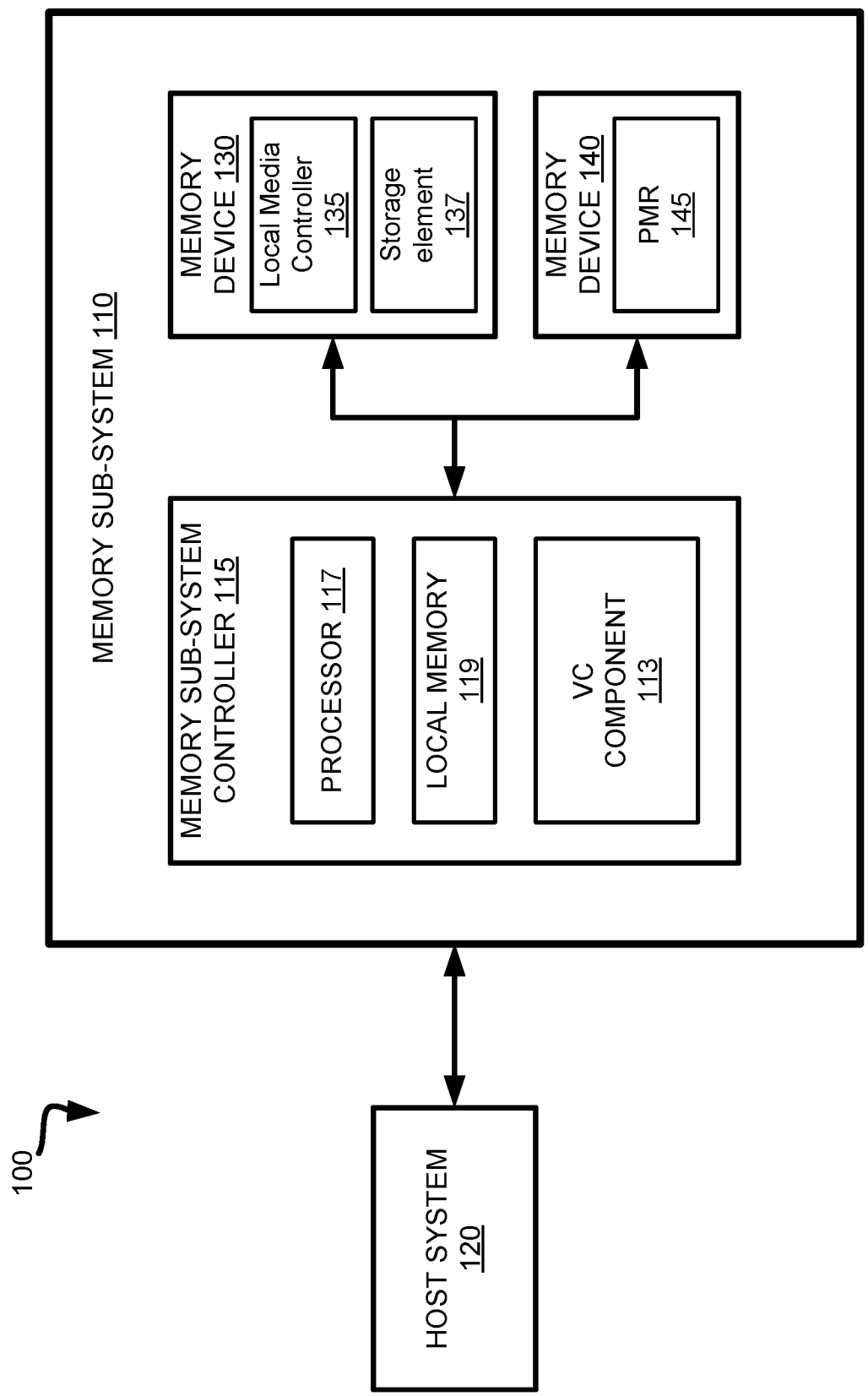
FIG. 1 illustrates an example computing system that includes a memory sub-system in accordance with some embodiments of the present disclosure.

Aspects of the present disclosure are directed to enabling devices with enhanced persistent memory region (PMR) access. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

It has become more important to have regions of system-exposed byte addressable memory alongside the block storage element for a variety of implementations or use cases that can make use of transaction oriented persistent memory, and modern application reliance on transaction consistency has grown significantly. Exemplary implementations that can make use of transaction oriented persistent memory include, but are not limited to, write journaling, logs for software RAID and erasure coding systems, commit logs for database, metadata for compressed volumes, staging for de-duplication, compression, etc., state transfers in failover environments, error/warning logging (e.g., device breadcrumbs), compression metadata tables for inline block compression, and cooperative storage domain metadata (e.g., virtual drive groups).

One solution being implemented is the use of non-volatile in-line memory modules (NVDIMMs). However, NVDIMM implementations can be expensive and have their own limitations. For example, NVDIMM may not be practical going forward as the technology may not easily apply to modern system architectures and because its protection mechanism between nodes cannot scale accordingly.

A memory device in a memory sub-system, such as a solid-state drive (SSD), can be accessed by a logical-device interface attached via a bus. One example of such a logical-device interface for accessing a memory device is Non-Volatile Memory Express (NVMe). A host system ("host") can access the memory sub-system via, e.g., a Peripheral Component Interconnect Express (PCIe) bus, and the access to the memory device(s) of the memory sub-system can be referred to herein as PCIe NVMe. More specifically, the memory sub-system (e.g., SSD) can include a storage element and a persistent memory region (PMR). For example, the storage element can include a block storage element. A PMR corresponds an area of readable persistent memory implemented as a power protected volatile memory device (e.g., power protected dynamic random-access memory (DRAM)). More specifically, the PMR can be a byte-addressable memory region accessible through a base address register (BAR). An NVMe SSD connected memory device can include a PMR, with such a device being referred to as an NVMe SSD device with PMR.

Although devices such as, e.g., NVMe SSD devices with PMR may provide the desired system-exposed byte addressable memory alongside the storage element, the potential lack of cacheability and/or coherency can make such devices less useful as it can make management more difficult, may require custom software, and can limit performance. Additionally, memory sizing within the PMR may be too small for many solutions. Accordingly, these exemplary drawbacks have limited widespread industry adoption as a solution that can make use of transaction oriented persistent memory.

Aspects of the present disclosure address the above and other deficiencies by having a memory sub-system that enables devices with enhanced PMR access. For example, a device described herein can be an NVMe SSD with PMR. More specifically, aspects of the present disclosure combine, in a single device, a storage element implemented on a first memory device including a non-volatile memory device with a PMR implemented on a second memory device, with an underlying interface standard that provides enhanced access to the PMR. For example, the memory sub-system can include an NVMe SSD device with PMR, in which the storage element is an NVMe block storage element. As one example, the PMR can be implemented as a power protected region on a volatile memory device. Here, the volatile memory device can include DRAM. As another example, the PMR can be implemented on a native non-volatile memory device, such as magnetic RAM (MRAM) or other similar non-volatile memory device. However, such examples should not be considered limiting. The devices described herein can be used to perform any suitable application(s). For example, a device can be implemented as a memory buffer to perform one or more persistent memory applications.

The underlying interface standard can implement one or more alternate protocols supported by another interface standard. For example, the underlying interface standard can implement one or more alternate protocols supported by PCIe (e.g., non-PCIe protocols). In some embodiments, the underlying interface standard is compute express link (CXL).

Generally, CXL is an interface standard that can support a number of protocols that can run on top of PCIe, including a CXL.io protocol, a CXL.mem protocol and a CXL.cache protocol. The CXL.io protocol is a PCIe-like protocol that can viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer. As will be described in further detail herein, CXL.io can be used to expose the storage element and CXL.mem and/or CXL.cache can be used to expose the PMR in a manner that provides enhanced PMR access.

Advantages of the present disclosure include, but are not limited to, exposure of regions of byte addressable memory alongside the SSD block storage element with increased cacheability and/or coherency, negligible added latency for the block storage element (e.g., about 25 ns), and compatibility with future central processing unit (CPU) and switching configurations. For example, the CXL.mem protocol can provide memory semantics (e.g., load and store commands) for enabling a PMR to be easily mapped into system memory in a manner that makes it cacheable and coherent. This scalability of this capability extends to multi-CPUs and multi-systems. Other features of CXL.mem such as, e.g., Global Persistent Flush, Dirty Shutdown, Viral Error Containment and a Mailbox Command Interface can solve at least some existing limitations of PMR (e.g., NVMe).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The visibility configuration (VC) component 113 can be used to enable the memory sub-system 110 (e.g., NVMe SSD device) with enhanced PMR access. The VC component 113 can combine, in a single device, a storage element 137 implemented on the memory device 130, which corresponds to a non-volatile memory device (e.g., an NVMe SSD block storage element) with a PMR 145 implemented on the memory device 140. For example, the memory device 140 can include a volatile memory device (e.g., DRAM) and the PMR 145 can be implemented as a power protected region on the volatile memory device. As another example, the memory device 140 can include a non-volatile memory device (e.g., MRAM) and the PMR 145 can be implemented on the non-volatile memory device. In some embodiments, the memory sub-system 110 can be a CXL device supporting CXL protocols. For example, the VC component 113 can configure visibility of the storage element 137 through CXL.io and visibility of the PMR 145 through CXL.mem and/or CXL.cache to enable a single CXL device that supports both block storage and PMR with enhanced PMR access. The VC component 113 can be used to implement any suitable device to perform any suitable application(s). For example, a memory buffer can be implemented to perform one or more persistent memory applications. In some embodiments, the memory sub-system controller 115 includes at least a portion of the VC component 113. In some embodiments, the VC component 113 is part of the host system 120, an application, or an operating system. In other embodiments, local media controller 135 includes at least a portion of VC component 113 and is configured to perform the functionality described herein. Further details with regards to the operations of the VC component 113 are described below.

Figure 2:
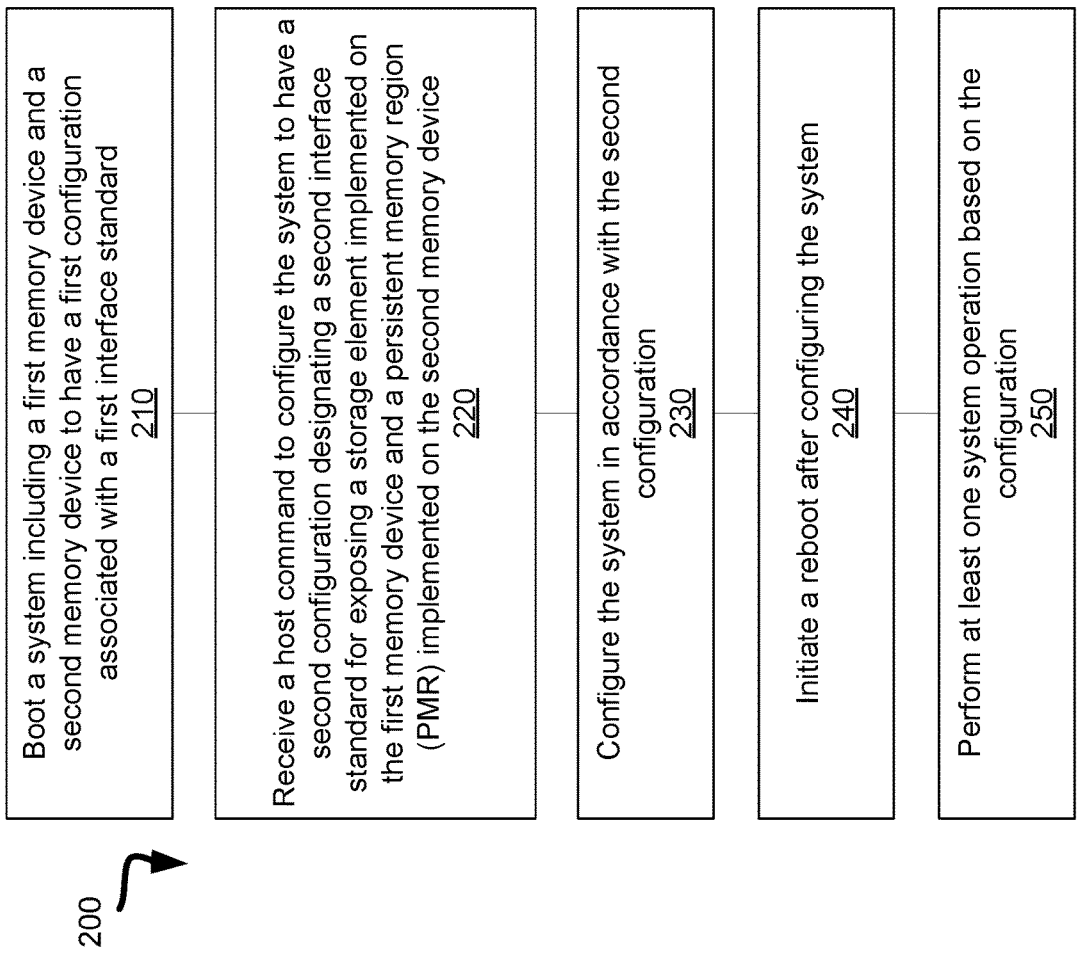
FIG. 2 is a flow diagram of an example method to enable devices with enhanced persistent memory region (PMR) access in accordance with some embodiments of the present disclosure.

FIG. 2 is a flow diagram of an example method 200 to enable devices with enhanced persistent memory regions (PMR) access, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the VC component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic boots a system including a first memory device and a second memory device to have a first configuration associated with a first interface standard. In one embodiment, the first interface standard is PCIe. However, such an embodiment should not be considered limiting, and the first interface standard can be any suitable interface standard in accordance with the embodiments described herein. More specifically, the first memory device can include a non-volatile memory device. In some embodiments, the non-volatile memory device includes NAND flash. The second memory device can be any suitable device for supporting a persistent memory region (PMR). In some embodiments, the second memory device includes a volatile memory device. For example, the volatile memory device can include DRAM, which can correspond to DDR. In some embodiments, the second memory device includes a second non-volatile memory device. For example, the second non-volatile memory device can include MRAM or other suitable non-volatile memory device. In some embodiments, the system includes an NVMe SSD device.

At operation 220, the processing logic receives a host command to configure the device to have a second configuration designating a second interface standard for exposing a storage element implemented on the first memory device and a persistent memory region (PMR) implemented on the second memory device. For example, in the embodiment in which the second memory device includes a volatile memory device, the PMR can be implemented as a power protected region on the volatile memory device. More specifically, the storage element will be visible through a first protocol of the second interface standard and the PMR region will be visible through a second protocol of the second interface standard. In the embodiment in which the system includes an NVMe SSD device, the storage element can be an NVMe block storage element.

The second interface standard enables enhanced access to the PMR. For example, the first protocol and the second protocol can be alternate protocols supported by the first interface standard. In some embodiments, the second interface standard is compute express link (CXL) supporting a first CXL protocol for exposing the storage element and a second CXL protocol for exposing the PMR. For example, the first CXL protocol can be the CXL.io protocol and the second CXL protocol can be the CXL.mem protocol or the CXL.cache protocol. The selection of the CXL.mem protocol and/or the CXL.cache protocol can depend on the desired implementation. However, such an embodiment should not be considered limiting, and the second interface standard can be any suitable interface standard in accordance with the embodiments described herein.

More specifically, the system can reconfigure itself as a multiport system where each of a number of ports has its own negotiated protocol. Here, all of the ports can be configured independently and/or simultaneously. After a configuration, a reboot can be needed. In some embodiments, the second configuration designates the second interface standard at a first port for exposing the storage element and a first region of the PMR, and at a second port for exposing the storage element and a second region of the PMR. For example, in such a dual port mode where the first and second ports are symmetric, the first port and the second port can each allow access to the storage element using the first protocol (e.g., CXL.io) and access to their respective regions of the PMR using the second protocol (e.g., CXL.mem or CXL.cache).

Under firmware control, the PMR can be programmatically configured for independent or overlapped first and second regions. For example, if the PMR has a size of 32 MB, the first port can be assigned 0-15 MB and the second port can be assigned 16-32 MB, the first and second regions are independent. As another example, if the first port is assigned 0-30 MB and the second port is assigned 15-32 MB, the first and second regions are overlapped. In the overlapping case, it can be the responsibility of the host to resolve write conflicts and/or ordering. The PMR memory range can be enabled by the device before booting in the second configuration. There are specific protocols on how to map and discovery memory (e.g., in the first and second interface standards) and each one has to be followed as required.

The PMR can be implemented as a power protected region on the volatile memory device using any suitable mechanism(s) in accordance with the embodiments described herein. For example, the PMR can be implemented as a power protected region on the volatile memory device by employing backup capacitors. Such backup capacitors can store charge that can be used to enable the PMR to write data in response to a power loss event. More specifically, the PMR memory region(s) can be written to non-volatile memory (e.g., SSD NAND) based on the energy provided by the backup capacitors. As will be described in further detail below with reference to FIG. 5, the system can initiate capacitor (CAP) checks to assess backup capacitor degradation.

At operation 230, the processing logic configures the system in accordance with the second configuration. For example, if the firmware is in control, the firmware can configure the system by carving out the required memory space for the PMR from its internal memory map. The memory space can be a contiguous memory segment simply characterized by internal memory offset and length, and this will be exposed just as a memory offset to system as the base address will be provided by the extensible firmware interface (EFI) and boot loader. In some embodiments, as described above, the system can reconfigure itself as a multiport (e.g., dual port) system.

At operation 240, the processing logic initiates a reboot after configuring the system. The reboot may be needed to rescan devices after the configuration change, and the reboot is not required in some embodiments. For example, the system can come up as a multiport (e.g., dual port) system after the reboot. In the embodiment in which the second interface standard is CXL, the CXL.io protocol can be used to discover capability and can detect a CXL.mem protocol and/or CXL.cache protocol capable memory region.

After operation 230 (and after any required reboot at operation 240), the host system can see two separate first and second identities corresponding to respective ones of the first and second interface standards. For example, in the case where the first interface standard is PCIe and the second interface standard is CXL, the first identity can include a namespace and the second identity can include CXL memory. The host system can then address the separate first and second identities independently, as if they were on completely separate devices, using separate data paths thus ensuring complete data separation and isolation. For example, SSD namespace can be claimed by a NVMe storage driver, while the CXL memory can be mapped either in kernel memory or even in user space memory, depending on usage model, and be directly byte accessible, coherent and cacheable and virtually indistinguishable from regular memory. The EFI and operating system (OS) can map a contiguous region inside the OS cacheable memory map (e.g., an input-output memory manage unit (IOMMU) map). Accordingly, the system can be configured to allocate a segment of the PMR as cacheable memory marked as visible through the second interface standard, and the segment of the PMR can be detected as an internal memory range that is shared through the second interface standard.

At operation 250, the processing logic performs at least one system operation based on the configuration. In some embodiments, the at least one system operation can include at least one error management operation. Examples of error management operations including protocol error management and data error management. In some embodiments, the at least one system operation is performed after the optional reboot.

A protocol error can be, for example, an error generated in response to an attempt by the system to access memory. Performing protocol error management can include receiving a protocol error and reporting the protocol error through the second interface standard (e.g., CXL.io).

A data error can be, for example, an error arising from an attempt of the first interface standard side (e.g., SSD side) to place or receive data from the second interface standard side (e.g., CXL side). In data error management, a data error will not be exposed to the second interface standard side. Instead, performing data error management can include receiving a data management error, processing the data management error by the storage element, and reporting the data management error through a reporting mechanism associated with the storage element. This can guarantee a separate data flow path (through the second interface standard, if necessary) and control path (through the first interface standard side).

Additionally, it may be necessary to keep track of poison statuses for every "line" (e.g., 64 B) of the PMR. Poison status can be retained through power cycles, and some form of memory scrubbing (e.g., "patrol scrubbing") can be needed depending on memory technology used for the PMR.

Figure 3:
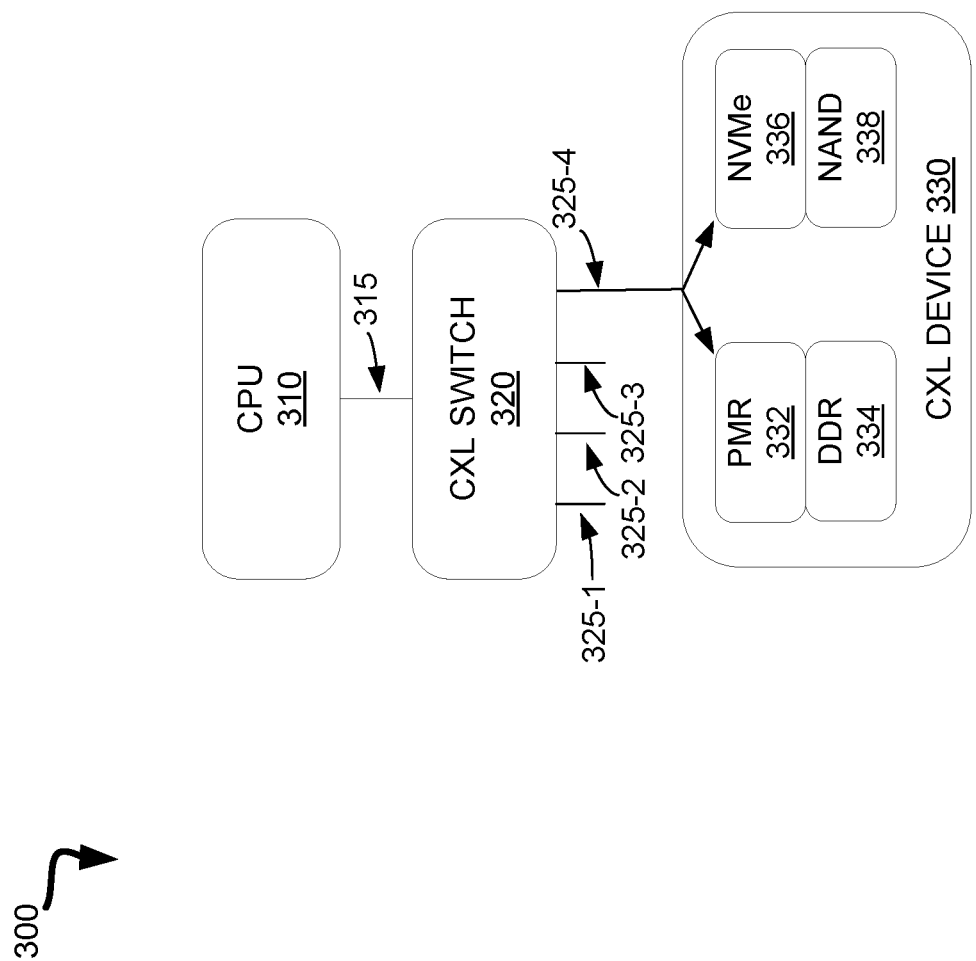
FIG. 3 is a block diagram of an example system including a device enabled with enhanced persistent memory region (PMR) access in accordance with some embodiments of the present disclosure.

FIG. 3 is a block diagram of an example system 300 including a device enabled with enhanced persistent memory region (PMR) access in accordance with some embodiments of the present disclosure. More specifically, in this illustrative example, the system 300 includes a compute express link (CXL) enabled NVMe SSD device with PMR.

The system 300 can include a central processing unit (CPU) 310. The CPU can correspond to a host system, such as host system 120. For example, the host system can be an NVMe host. The system 300 can further include a CXL switch 320 operatively coupled to the CPU component 320 via a first CXL connection 315. The first CXL connection 315 can include a set of data-transmission lanes ("lanes") for implementing CXL protocols, including CXL.io, CXL.mem, and CXL.cache. The first CXL connection 315 can include any suitable number of lanes in accordance with the embodiments described herein. For example, the first CXL connection 315 can include 16 lanes (i.e., CXL×16).

The system 300 can further include a number of second CXL connections 325-1 through 325-4, and a CXL device 330 operatively coupled to the CXL switch via one of the second CXL connections 325-1 through 325-4. In this illustrative example, the CXL device 330 is operatively coupled to the CXL switch 320 via the second CXL connection 325-4. Each of the second CXL connections 325-1 through 325-4 can include a corresponding set of lanes each including any suitable number of lanes in accordance with the embodiments described herein. For example, the second CXL connection 325-4 can include 4 lanes (CXL×4).

In this illustrative example, the CXL device 330 is an NVMe SSD device including a number of sub-components. More specifically, the sub-components include a PMR 332, a DDR memory 334 (e.g., memory device 140), an NVMe block storage element 336, and a NAND memory 338 (e.g., memory device 130). The DDR memory 334 can also be used in the operation of the NAND memory 338 as well, but as a logically different DDR. The DDR memory 334, NVMe block storage element 336, and the NAND memory 338 are exemplary in this illustrative NVMe SSD example.

The CXL device 330 can provide support for at least CXL.io and CXL.mem. More specifically, the PMR 332 can be accessible over CXL.mem and the NVMe block storage element 336 can be accessible over CXL.io. By using, e.g., CXL.io for the NVMe block storage element 336 and using, e.g., CXL.mem for the PMR 332, a single device can be obtained that supports both block storage and PMR that is cacheable and coherent. Since CXL is designed to be low-latency there is negligible added latency (e.g., 25 ns) for the NVMe block storage element 336. CXL.mem latencies are targeting ~80 ns assuming memory is at DDR speeds. In the embodiment in which the PMR 332 is visible through CXL.mem, the CXL device 330 can be implemented within a memory buffer to perform one or more persistent memory applications, as will be described in further detail below with reference to FIG. 4.

Using the configuration shown in FIG. 3, the CXL device 330 can boot as, e.g., PCIe with CXL.io protocol and CXL.mem protocol support. The NVMe block storage element 336 can be accessed using CXL.io, with enhanced PMR access being provided using CXL.mem. More specifically, the CXL device 330 can allocate a segment of memory for the PMR 332 that will be visible through CXL.mem. For example, the PMR 332 can have a size of 32 MB. However, such a size is purely exemplary. This segment of memory corresponding to the PMR 332 can then be marked as shareable and cacheable.

Consider a dual port mode including symmetric first and second ports. Under firmware control, regions within the PMR 332 can be programmatically configured for independent or overlapped memory regions. For example, assume that the PMR 332 has a size of 32 MB. In one case, the first port can be assigned 0-15 MB and the second port can be assigned 16-32 MB. In another case, the first port can be assigned 0-30 MB and a second port can be assigned 15-32 MB. In the latter case, 15-30 MB is being shared across the first and second ports, resulting in an overlap across the first and second ports. It is the host responsibility to resolve conflicts and/or ordering.

The system 300 can provide for various types of error management, including protocol error management and data error management. In protocol error management, a protocol error (e.g., an error generated in response to an attempt by the system to access memory) is reported through CXL.io. In data error management, a data error (e.g., an error arising from an attempt of the SSD side to place or receive data from the CXL side) will not be exposed to the CXL side. Instead, the data error can be processed by the SSD side and reported through an SSD error reporting mechanism. This can guarantee a separate data flow path (through CXL, if necessary) and control path (through the SSD side). Additionally, CXL includes the possibility of poison indication. It may be necessary to keep track of poison statuses for every "line" (e.g., 64 B) of the PMR 332. Poison status should be retained through power cycles, and some form of memory scrubbing (e.g., "patrol scrubbing") can be needed depending on memory technology used for the PMR 332.

A number of considerations can be taken into account to ensure proper PMR operation and performance resulting from the exposure of the PMR using the CXL.mem protocol. One consideration is startup and shutdown. For example, since PMR is persistent, special startup and shutdown solutions can be provided to synchronize "state" with the host. The host may not be aware of things that are causing the PMR to not be "ready" or available, such as, e.g., power loss or memory degradation. Thus, a mechanism can be provided in accordance with the embodiments described herein to notify or communicate certain PMR state or readiness to the host. More specifically, a special status register can be defined that indicates "% readiness," where a scale of 0%-100% gives not only an indication of "not ready," but also a linear estimate of how long until "ready." Notification of this register changing state can be accomplished through Asynchronous Event Notification (AEN), which is mechanism defined as part of, e.g., the NVMe specification. The host application that uses PMR capability could thus observe a PMR readiness register at start-of-day and upon any AEN as a gate to any PMR operations or risk the loss of data. It is noted that time to boot and time to PMR readiness can be variable due to PMR size. To ensure integrity and synchronization with the host, a memory area hash can be used. For example, a host could keep its own hash and, upon 100% readiness, can be compared with a device version of the hash. The hash could also be stored in the storage (e.g., NAND) side of the system (e.g., SSD) (or even on another storage device). Time to PMR readiness or availability can be estimated based on the actions that need to be taken to get the PMR into a ready or available state.

Another consideration is AEN. AEN by itself does not directly communicate with applications that are making use of the PMR. Rather, the AEN generally notifies a storage driver that the memory happens to be attached to. Since the PMR application is not the storage driver, a thin driver in a storage stack on the host, which communicates with the PMR application, can be used to manage delivery of such events using the AEN mechanism (e.g., by employing a device mapper). More specifically, the thin driver can detect relevant AEN events that are relevant to the PMR and signal the relevant AEN events to the proper PMR driver.

Another consideration is degraded capability. For example, in the event of power loss, it can be important to have a mechanism that provides enough time to write any data that is not committed to non-volatile memory. For example, as described above with reference to FIG. 2, backup capacitors can be used to store energy to enable data writes in the event of power loss. In embodiments in which PMR is implemented as a power protected region on a volatile memory device (e.g., DRAM), PMR can rely on mechanisms such as, e.g., capacitors to enable data writes to non-volatile memory (e.g., NAND flash) in the event of power loss. However, a capacitor can degrade over time, and thus negatively affect the ability of the capacitor to provide data write support during a power loss event. To ensure proper PMR operation, periodic capacitor checks ("CAP checks") can be employed. Such CAP checks can validate that there is sufficient energy in the event of power loss, such that the device can have enough time to ensure data currently stored in volatile memory (e.g., DRAM) can be successfully written into non-volatile memory (e.g., NAND flash). Further details regarding such CAP checks will be described below with reference to FIG. 5.

Multiple levels or modes of operation can be defined to align with CAP conditions. For example, the modes can include a partially degraded PMR capacity reduced mode (i.e., the amount of PMR memory that is used can be reduced), and a read only mode (e.g., when the PMR can no longer be protected by the capacitor(s)). This event can be reported to the host through AEN and managed by the same thin driver above. Accordingly, AEN notification can enable the host to adjust the amount of memory being used, stop using the memory entirely, backup the memory, etc.

As mentioned above, there may be situations where there was some sort of degradation occurs and it becomes necessary to adjust the PMR size with the host. Examples of situations include, but are not limited to, capacitor degradation, non-volatile memory (e.g., NAND) capacity reduction, and volatile memory (e.g., DRAM) capacity reduction and/or high error rate that cannot be addressed using error-correcting code (ECC). To address such situations, a mechanism can be used to specify PMR size based on severity of situation. More specifically, the mechanism can include registers. For example, if the device has lost ability to reliably protect, e.g., 50% of the existing PMR, a PMR range that is to be read only (previously stored to non-volatile memory and still accessible) and another region that is still read/write capable can each be indicated. In a severe situation, the range may entirely be read-only or even "offline."

Another consideration is performance metric customization. For example, it can be useful in some instance to have PMR regions with customized performance metrics for different applications that have varying priorities. To achieve this, control registers can be defined along with a protocol agreement between host and device to enable regions (e.g., address ranges) together with the performance metrics. Examples of performance metrics include, but are not limited to, "maximum performance/throughput" (e.g., if a region as marked as maximum performance/throughput, sustained access is permitted to achieve maximum throughput) "lowest latency" (e.g., if a region is marked as lowest latency, the region can be prioritized upon access), "read only" (e.g., if a region is marked as read only, can ensure that data has been written to non-volatile memory (e.g., NAND flash) and not allow any writes), and "balanced performance."

Another consideration related to performance degradation are "dirty PMR lines" in which contents have changed since last refresh from non-volatile memory (e.g., NAND flash). Related to a degraded mode of operation where the ability to protect PMR is reduced, additional metadata associated with each PMR "line" can be employed that indicates whether the line is "dirty." If metadata indicates a "dirty PMR line," then the host has modified the contents in some way. A dirty PMR line can become a liability in the event of asynchronous power loss (APL). Operation of the PMR in degraded states can, however, be extended by keeping track of percent of the PMR lines that are "dirty" versus the time it would take to write "dirty" lines to NAND. For example, if there are 1,000 PMR lines that are managed, but only 500 can be taken care of, the number of outstanding dirty lines cannot exceed 500.

Figure 4:
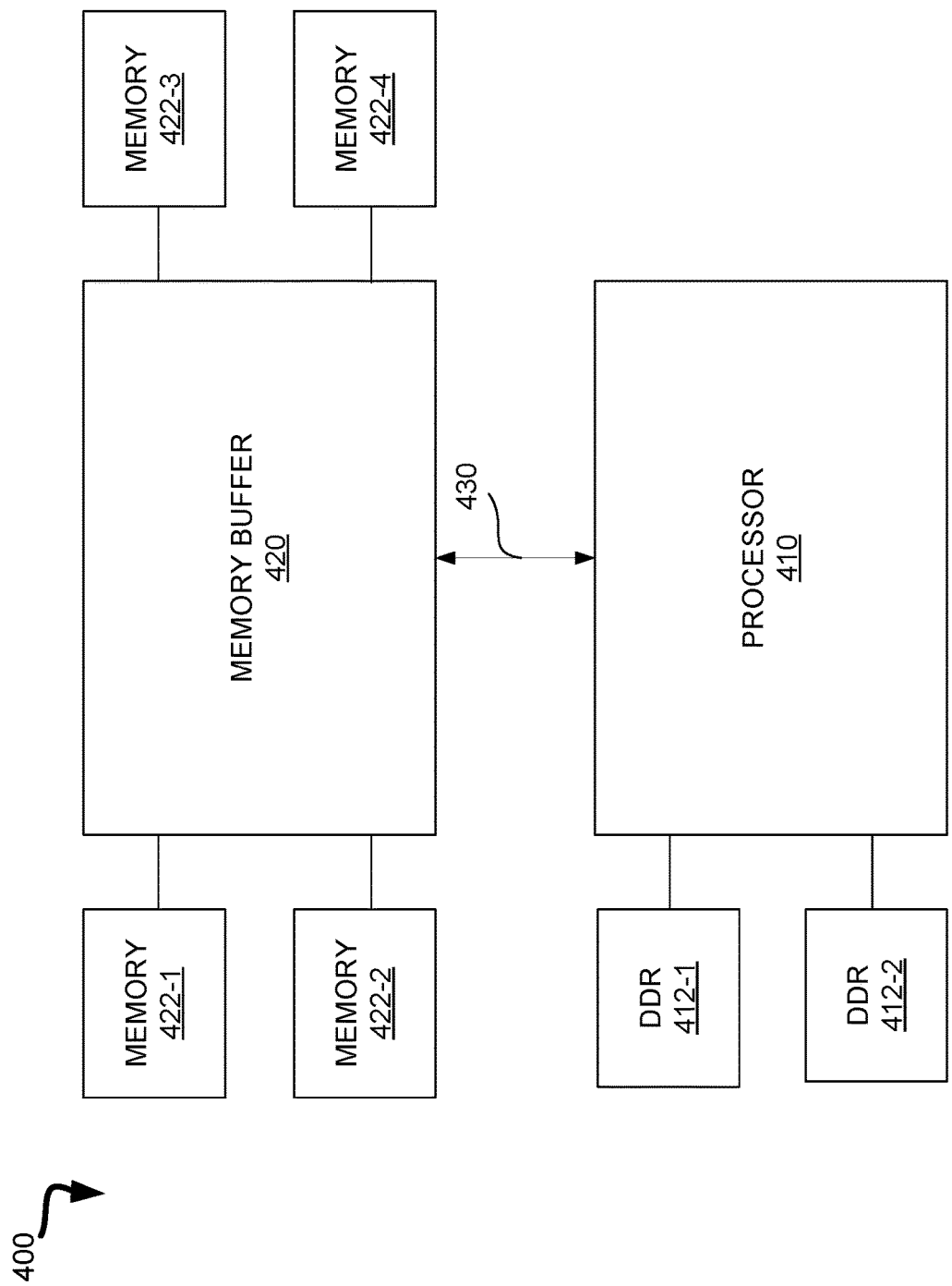
FIG. 4 is a block diagram of an example system implementing a device enabled with enhanced persistent memory region (PMR) access in accordance with some embodiments of the present disclosure.

FIG. 4 is a block diagram of an example system 400. As shown, the system 400 includes a processor 410 operatively coupled to a number of DDRs, including DDR 412-1 and DDR 412-2. The system 400 further includes a memory buffer 420 operatively coupled to a number of memories, including memories 422-1 through 422-4. The processor 410 and the memory buffer 420 are in communication via link 430. The memory buffer 420 can include a device enabled with enhanced PMR access, such as the device 330 of FIG. 3. For example, the link 430 can run CXL interface standard protocols, and the memory buffer 420 can include a storage element visible through, e.g., CXL.io, and a PMR visible through, e.g., CXL.mem. However, such an embodiment should not be considered limiting.

In this illustrative embodiment, the system 400 implements a memory buffer 420 to perform one or more persistent memory applications. However, such an implementation is purely exemplary, and devices enabled with enhanced PMR access as described herein can be implemented in any suitable context.

Figure 5:
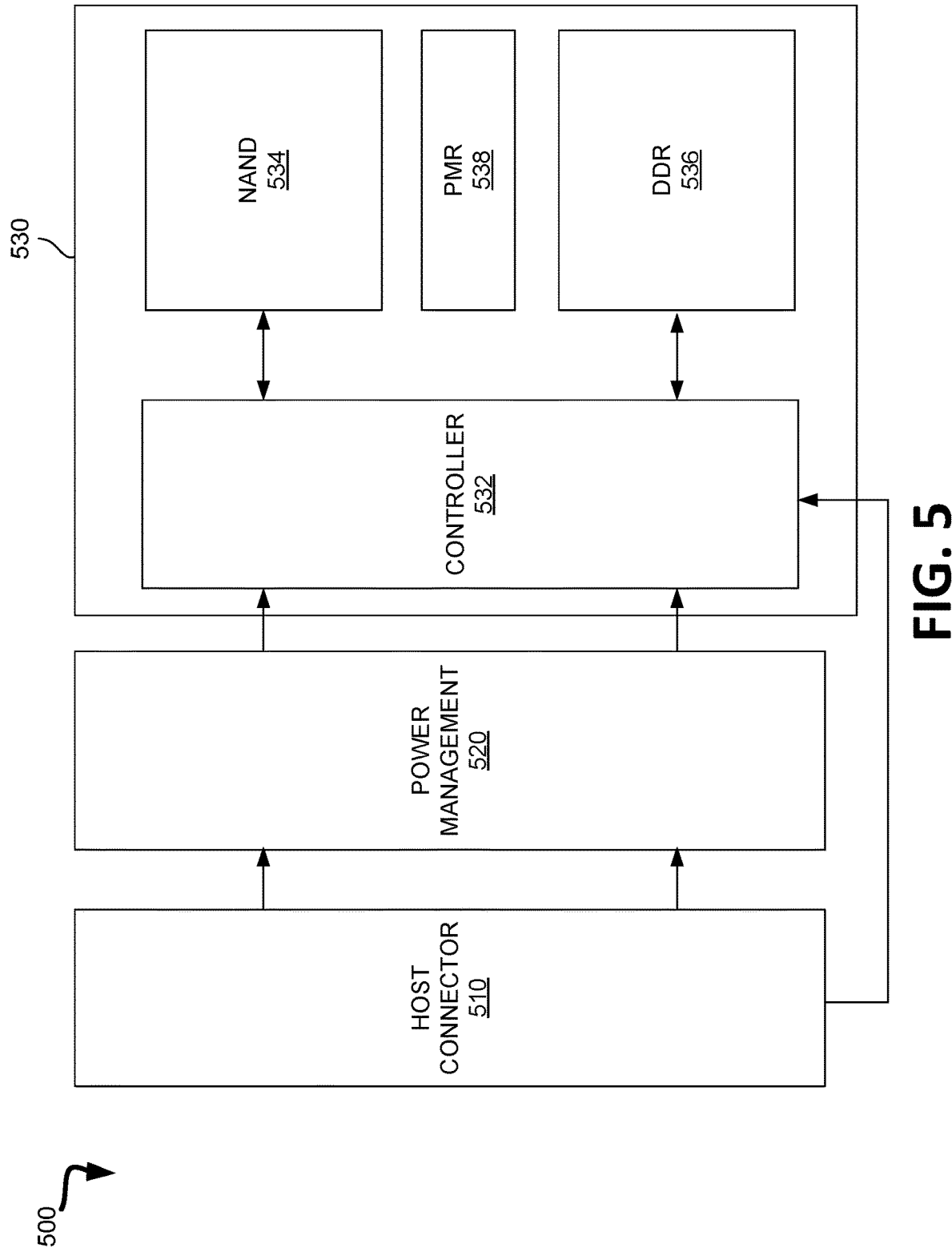
FIG. 5 is a block diagram illustrating a system for implementing a capacitator (CAP) check in accordance with some embodiments of the present invention.

FIG. 5 illustrates an example power system 500, in accordance with some embodiments of the present disclosure. As shown, the power system 500 includes a host connector component 510, a power management component 520, and a sub-system component 530, such as the sub-system 110 of FIG. 1, enabled with enhanced persistent memory region (PMR) access.

In some embodiments, the host connector component 510 is an NVMe host connector. The power management component 520 is associated with a storage voltage (Vstrg) and can include a power management integrated circuit (PMIC) sub-component and an inrush/backup sub-component. The sub-system component 530 can include a controller component 532 (e.g., an application-specific integrated circuit (ASIC) controller). The power management component 520 can be operatively coupled with the controller component 532 via, e.g., an Inter-Integrated Circuit ($I^2C$) protocol. The sub-system component 530 can further include a NAND 534, a DDR 536 and a PMR 538. The controller component 532 is operatively coupled to the NAND 534 and the DDR 536. In some embodiments, the sub-system component 530 includes an NVMe SSD device.

The components 510-530 can communicate with each other to enable a capacitor (CAP) check or test to ensure proper operation of the PMR 538, as described above with reference to FIGS. 2 and 3. More specifically, the controller component 532 can periodically communicate with the power management component 520 to trigger the CAP check, receive results of the CAP check, and determine availability or status of the PMR 538 based on the results. For example, during the CAP check a capacitor can be discharged through an external resistor from a first pin connected to the capacitor for energy storage and release, to a second pin for connecting the external resistor for the CAP test. A transistor (e.g., field-effect transistor (FET)) can be connected to the second pin and a third pin connected to ground. When a start CAP test register bit is set (e.g., via an $I^2C$ interface), the second pin can be connected to ground through the transistor for energy discharge. More specifically, power can be stopped at an initial time, at which the capacitor can begin discharging from an initial voltage and an internal timer begins to count. The internal timer can keep counting until the storage voltage hits a threshold at an end time at which the internal timer can stop counting and an end voltage can be measured. Accordingly, the discharge time can be measured as the difference between the initial time and the end time, and the voltage discharge can be measured as the difference between the initial voltage and the end voltage.

Figure 6:
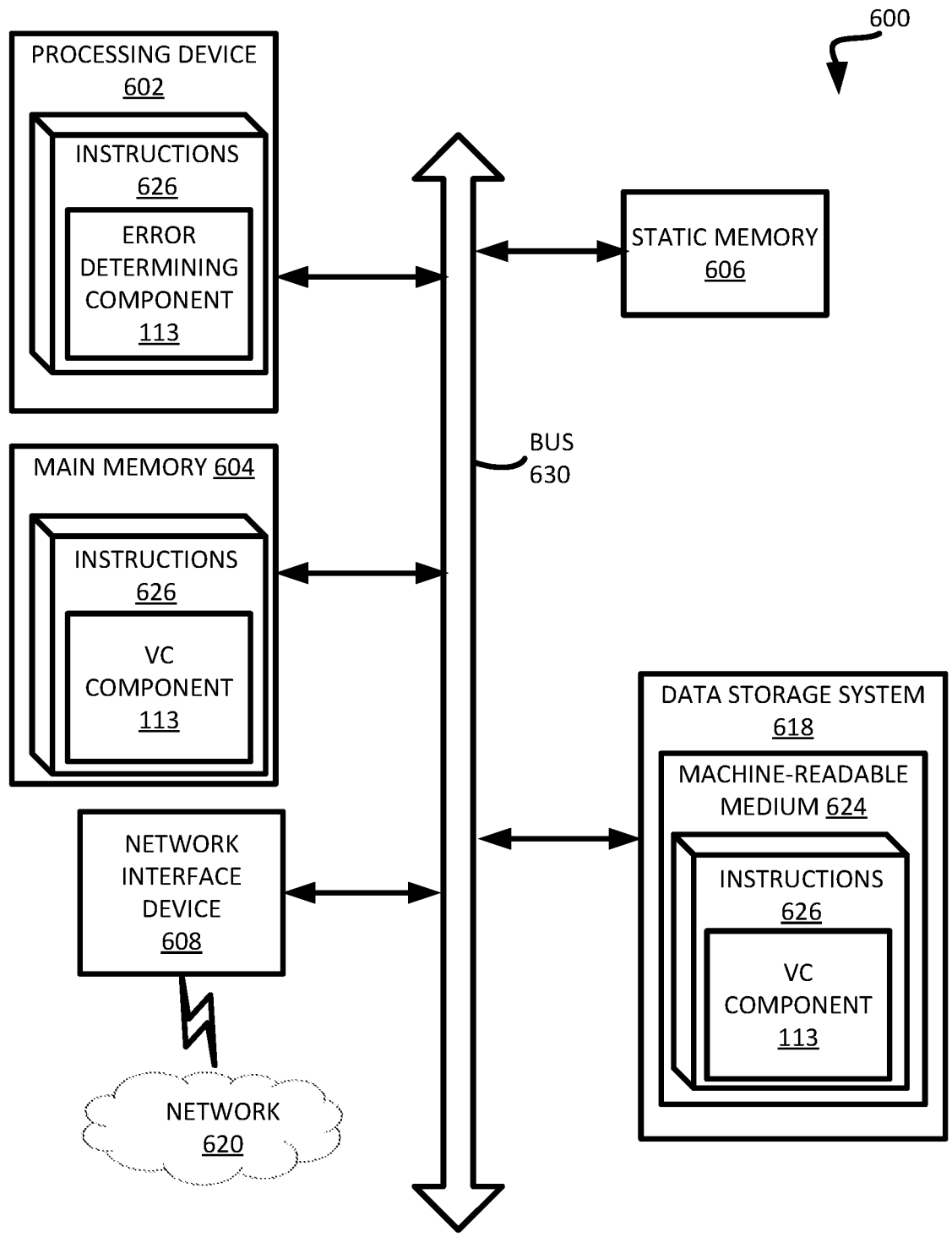
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the VC component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a VC component (e.g., the VC component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a first memory device comprising a non-volatile memory device;
a second memory device; and
a processing device, operatively coupled with the first memory device and the second memory device, to perform operations comprising:
configuring the system in accordance with a configuration designating an interface standard for exposing a storage element implemented on the first memory device to a first protocol of the interface standard and a persistent memory region (PMR) implemented on the second memory device to a second protocol of the interface standard, wherein the configuration designates the interface standard at a first port for exposing the storage element and a first region of the PMR and at a second port for exposing the storage element and a second region of the PMR; and
performing at least one system operation based on the configuration.

2. The system of claim 1, wherein the first memory device comprises a non-volatile memory express solid-state drive (NVMe SSD) and the storage element is an NVMe block storage element.

3. The system of claim 1, wherein the second memory device comprises a second non-volatile memory device or a volatile memory device.

4. The system of claim 1, wherein the first protocol and the second protocol are alternate protocols supported by peripheral component interconnect express (PCIe), the interface standard is compute express link (CXL), the first protocol is a CXL.io protocol, and the second protocol is at least one of a CXL.mem protocol or a CXL.cache protocol.

5. The system of claim 1, wherein performing the at least one system operation comprises performing at least one of:
receiving a protocol error and reporting the protocol error through the interface standard; or
receiving a data management error, processing the data management error by the storage element, and reporting the data management error through a reporting mechanism associated with the storage element, thereby supporting a separate control path and data flow path.

6. The system of claim 5, wherein configuring the system comprises allocating a segment of the PMR as cacheable memory marked as visible through the interface standard, and wherein the segment of the PMR is detected as an internal memory range that is shared through the interface standard.

7. A method comprising:
configuring, by a processing device, a system in accordance with a configuration designating an interface standard for exposing a storage element implemented on a first memory device to a first protocol of the interface standard and a persistent memory region (PMR) implemented on a second memory device to a second protocol of the interface standard, wherein the first memory device comprises a non-volatile memory device, and wherein the configuration designates the interface standard at a first port for exposing the storage element and a first region of the PMR and at a second port for exposing the storage element and a second region of the PMR; and
performing, by the processing device, at least one system operation based on the configuration.

8. The method of claim 7, wherein the first memory device comprises a non-volatile memory express solid-state drive (NVMe SSD) and the storage element is an NVMe block storage element.

9. The method of claim 7, wherein the second memory device comprises a second non-volatile memory device or a volatile memory device.

10. The method of claim 7, wherein the first protocol and the second protocol are alternate protocols supported by peripheral component interconnect express (PCIe), the interface standard is compute express link (CXL), the first protocol is a CXL.io protocol, and the second protocol is at least one of a CXL.mem protocol or a CXL.cache protocol.

11. The method of claim 7, wherein performing the at least one system operation further comprises performing at least one of:
receiving a protocol error and reporting the protocol error through the interface standard; or
receiving a data management error, processing the data management error by the storage element, and reporting the data management error through a reporting mechanism associated with the storage element, thereby supporting a separate control path and data flow path.

12. The method of claim 11, wherein configuring the system comprises allocating a segment of the PMR as cacheable memory marked as visible through the interface standard, and wherein the segment of the PMR is detected as an internal memory range that is shared through the interface standard.

13. A non-transitory computer-readable storage medium comprising instructions that, when executed by a processing device, cause the processing device to perform operations comprising:
configuring a system in accordance with a configuration designating an interface standard for exposing a storage element implemented on a first memory device to a first protocol of the interface standard and a persistent memory region (PMR) implemented on a second memory device to a second protocol of the interface standard, wherein the first memory device comprises a non-volatile memory device, and wherein the configuration designates the interface standard at a first port for exposing the storage element and a first region of the PMR and at a second port for exposing the storage element and a second region of the PMR; and
performing at least one system operation based on the configuration.

14. The non-transitory computer-readable storage medium of claim 13, wherein the first memory device comprises a non-volatile memory express solid-state drive (NVMe SSD) and the storage element is an NVMe block storage element.

15. The non-transitory computer-readable storage medium of claim 13, wherein the first protocol and the second protocol are alternate protocols supported by peripheral component interconnect express (PCIe), the interface standard is compute express link (CXL), the first protocol is a CXL.io protocol, and the second protocol is at least one of a CXL.mem protocol or a CXL.cache protocol.

16. The non-transitory computer-readable storage medium of claim 13, wherein performing the at least one system operation comprises performing at least one of:
  receiving a protocol error and reporting the protocol error through the interface standard; or
  receiving a data management error, processing the data management error by the storage element, and reporting the data management error through a reporting mechanism associated with the storage element, thereby supporting a separate control path and data flow path.

17. The non-transitory computer-readable storage medium of claim 13, wherein configuring the system comprises allocating a segment of the PMR as cacheable memory marked as visible through the interface standard, and wherein the segment of the PMR is detected as an internal memory range that is shared through the interface standard.

* * * * *